(12) United States Patent
Cheng et al.

(10) Patent No.: US 11,361,102 B2
(45) Date of Patent: Jun. 14, 2022

(54) DATA SECURITY

(71) Applicant: BARCLAYS SERVICES LIMITED, London (GB)

(72) Inventors: Lawrence Cheng, London (GB); Jeremy Goldstone, Manchester (GB)

(73) Assignee: Barclays Execution Services Limited, London (GB)

( * ) Notice: Subject to any disclaimer, the term of this patent is extended or adjusted under 35 U.S.C. 154(b) by 209 days.

(21) Appl. No.: 16/604,987

(22) PCT Filed: Apr. 13, 2018

(86) PCT No.: PCT/GB2018/050988
§ 371 (c)(1),
(2) Date: Oct. 11, 2019

(87) PCT Pub. No.: WO2018/189555
PCT Pub. Date: Oct. 18, 2018

(65) Prior Publication Data
US 2020/0074114 A1    Mar. 5, 2020

(30) Foreign Application Priority Data
Apr. 13, 2017  (GB) .................................... 1706015

(51) Int. Cl.
*H04L 29/06*    (2006.01)
*G06F 21/62*    (2013.01)
(Continued)

(52) U.S. Cl.
CPC .......... *G06F 21/6245* (2013.01); *G06F 21/44* (2013.01); *G06F 21/53* (2013.01);
(Continued)

(58) Field of Classification Search
CPC ...... G06F 21/6245; G06F 21/44; G06F 21/53; G06F 21/57; G06F 21/602; G06F 21/74
See application file for complete search history.

(56) References Cited

U.S. PATENT DOCUMENTS

2003/0135507 A1*  7/2003  Hind ....................... G06F 21/31
2013/0042295 A1*  2/2013  Kelly .................... H04W 12/35
                                                                 726/1

(Continued)

FOREIGN PATENT DOCUMENTS

WO   WO-2012/151152 A1   11/2012
WO   WO-2017/034312 A1    3/2017

OTHER PUBLICATIONS

PCT International Search Report and Written Opinion for Application No. PCT/GB2018/050988 dated Oct. 18, 2018. (10 pages).

*Primary Examiner* — Jason K Gee
(74) *Attorney, Agent, or Firm* — Foley & Lardner LLP

(57) ABSTRACT

Systems and methods for managing data security are described. In an embodiment, the method comprises receiving a data access request from a first application that runs in a first operating environment of a mobile device, wherein the authentication request contains credentials of the first application, communicating with a second application that runs in a second operating environment in parallel to the first environment of the mobile device, wherein the second application is a trusted application that runs in a secure environment, and wherein the communicating includes transferring the credentials of the first application to the second application, and receiving data from the trusted application responsive to the data access request, based on the credentials of the first application.

21 Claims, 8 Drawing Sheets

(51) Int. Cl.
  *G06F 21/44* (2013.01)
  *G06F 21/53* (2013.01)
  *G06F 21/57* (2013.01)
  *G06F 21/60* (2013.01)
  *G06F 21/74* (2013.01)
  *G06Q 20/32* (2012.01)

(52) U.S. Cl.
  CPC ............ *G06F 21/57* (2013.01); *G06F 21/602* (2013.01); *G06F 21/74* (2013.01); *G06Q 20/3227* (2013.01)

(56) References Cited

U.S. PATENT DOCUMENTS

| | | | |
|---|---|---|---|
| 2013/0305333 A1 | 11/2013 | Katzer et al. | |
| 2015/0332262 A1* | 11/2015 | Lingappa | G06Q 20/322 705/71 |
| 2015/0348015 A1* | 12/2015 | Ren | G06Q 20/085 705/41 |
| 2016/0260084 A1 | 9/2016 | Main et al. | |

* cited by examiner

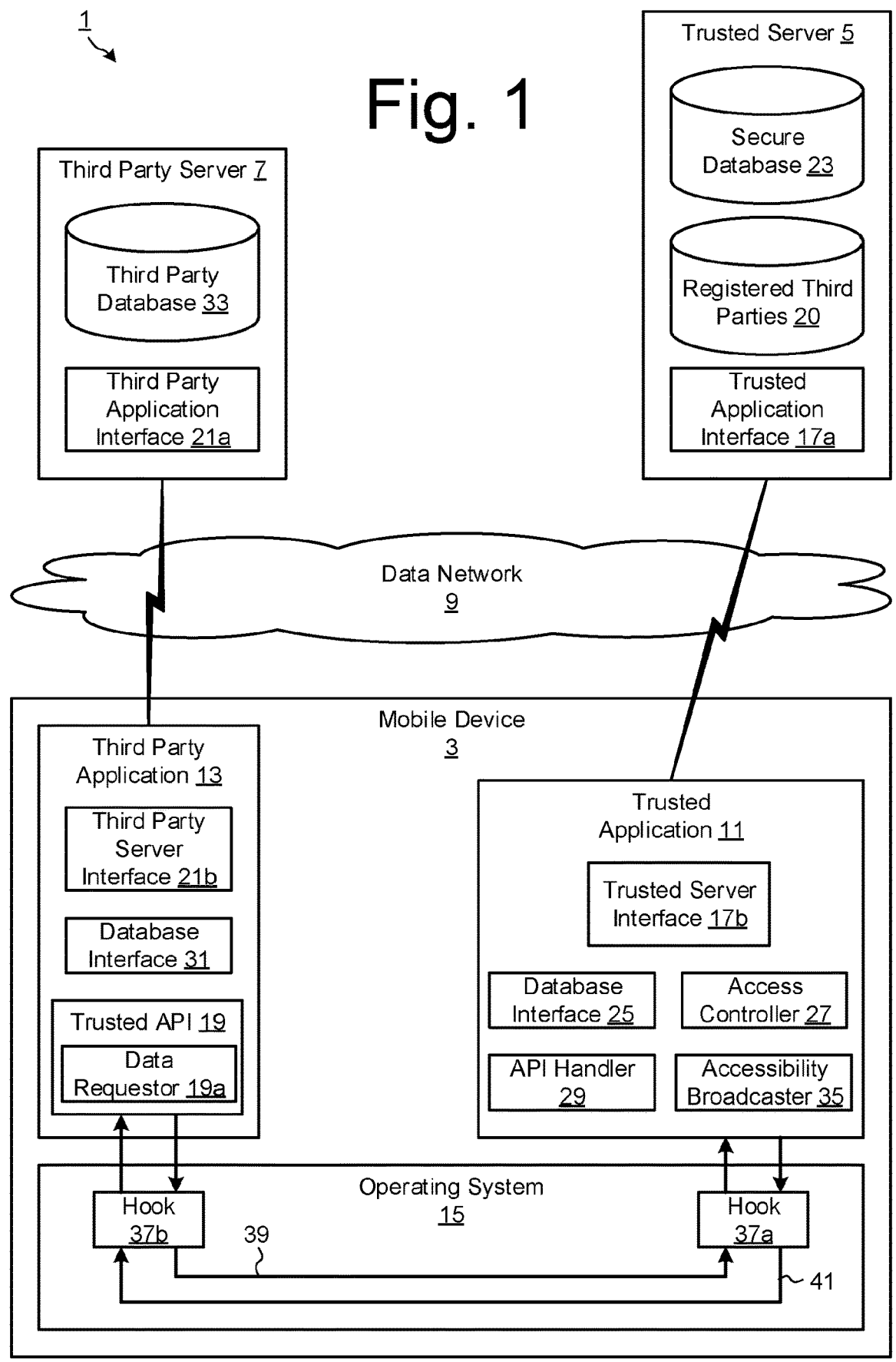

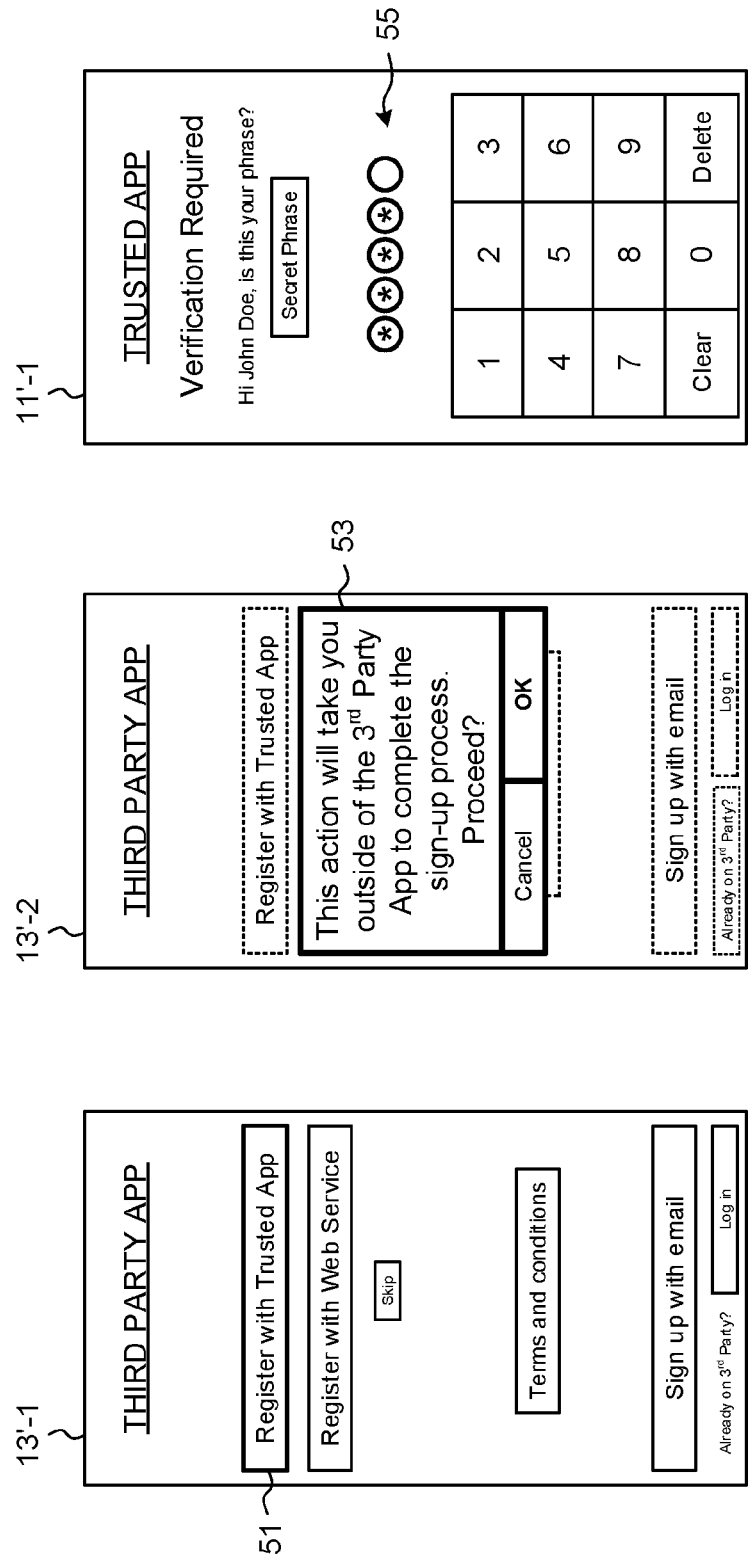

TRUSTED APP

Share Data with Third Party

Required details

| First Name | John |
| Last Name | Doe |
| Email | johndoe@xyz.com |
| Address1 | 1 Any Lane |
| Postcode | ABC 123 |

Payment options

| Card1 icon | xxxx xxxx xxxx 1234 |
| Card2 icon | xxxx xxxx xxxx 4567 |
| Card3 icon | xxxx xxxx xxxx 7890 |
| Acct1 icon | From bank account |
| Acct2 icon | From credit card account |

Optional details

| Photo | Image |
| Birthdate | 1 January 1990 |
| Phone | 0123 456 7890 |

Terms and conditions

Decline | Share

FIG. 3D

DATA SECURITY

CROSS REFERENCE TO RELATED APPLICATIONS

This application is a 371 Application of International Application No. PCT/GB2018/050988, filed Apr. 13, 2018 which claims priority to GB Application No. 1706015.3, filed Apr. 13, 2017, the entire contents of which are incorporated herein by reference.

FIELD OF THE INVENTION

This invention relates generally to data security and, more particularly, to controlling access to data in an online environment.

BACKGROUND

Mobile e-commerce is becoming more and more prevalent, with an ever-increasing number of merchant entities providing an online presence, such as a mobile application offering services to new and existing customers. Typically, each merchant application requires the user to create a customer account with the associated merchant, including customer data such as username and password, delivery/shipping address, contact info such as email address and telephone number, etc., and payment card details, such as the card PAN, expiry date, billing address, etc. from a trusted banking and/or payment instrument issuer entity. Known mobile e-commerce interfaces are inefficient, cumbersome, susceptible to fraudulent data interception, and prone to user abandonment, and typing error by the users which may result in payment authorisation request decline, wrong delivery address, etc.

Existing solutions such as single sign-on and third-party electronic wallet systems do not fully address the above technical concerns. Accordingly, there remains a need for technical improvements in the art.

SUMMARY OF THE INVENTION

According to one aspect, the present invention provides a method comprising generating a data request at a first application that runs in a first operating environment of a mobile device, wherein the data request contains data identifying the first application or an entity associated with the first application; communicating with a second application that runs in a second operating environment in parallel to the first environment of the mobile device, wherein the second application is a trusted application that runs in a secure environment, and wherein the communicating includes transferring the data request identifying the first application to the second application; and receiving data from the trusted application responsive to the data request, based on the identifying data.

In another aspect, the present invention provides a method comprising receiving a data request from a first application that operates in a first environment of a mobile device, wherein the data request contains data identifying the first application or an entity associated with the first application, the data request received by a second application that operates in a second environment in parallel to the first environment of the mobile device, wherein the second application is a trusted application that operates in a secure environment; retrieving data responsive to the data request, based on the identifying data; and communicating the retrieved data from the trusted application to the first application.

In other aspects, there are provided apparatus and systems configured to perform the methods as described above. In a further aspect, there is provided a computer program comprising machine readable instructions arranged to cause a programmable device to carry out the any one of the methods as described above.

BRIEF DESCRIPTION OF THE DRAWINGS

There now follows, by way of example only, a detailed description of embodiments of the present invention, with references to the figures identified below.

FIG. 1 is a schematic block flow diagram showing the main components of an online data processing system, according to an embodiment of the invention.

FIG. 2, which comprises

FIG. 3, which comprises FIGS. 3A to 3D, are exemplary user interfaces of the example secured data retrieval process illustrated in FIG. 2, in the exemplary context of online user account registration;

FIG. 5, which comprises

DESCRIPTION OF EMBODIMENTS

Figure 2A:
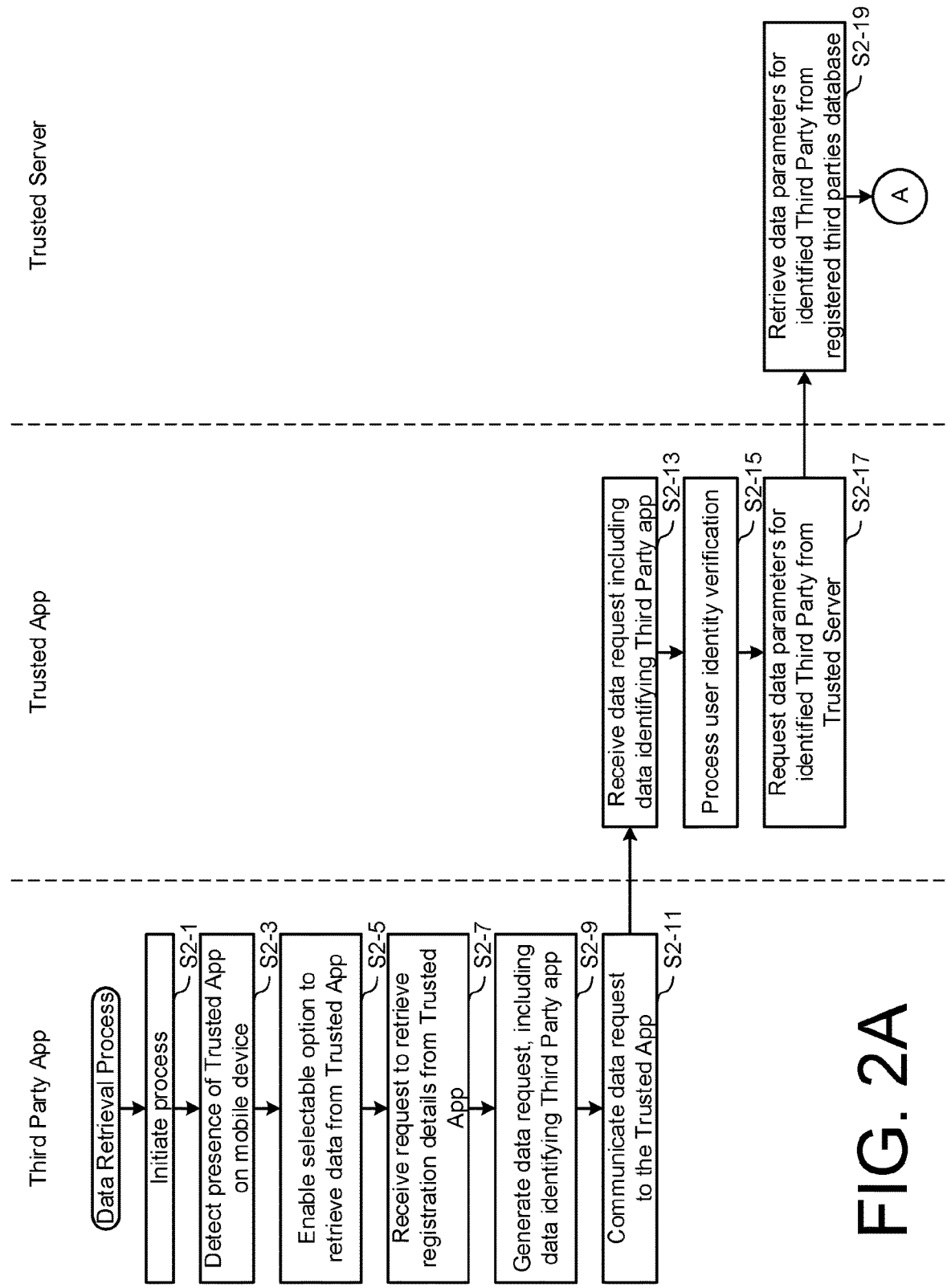
FIGS. 2A and 2B, is a flow diagram illustrating the main processing steps performed by data processing components of the system of FIG. 1 in secured data retrieval process, according to an exemplary embodiment.

The present disclosure discloses methods and systems that enhance the security of mobile data communications, so that the fraudulent access to sensitive data is substantially prevented or reduced. FIG. 1 shows the main components of an online data processing system 1 according to an embodiment. The system 1 includes a mobile device 3 such as a mobile telephone handset, a computer tablet, a laptop, or the like, in communication with a trusted server 5 and a third party server 7 over a data network 9. In an exemplary embodiment, the trusted server 5 is associated with a payment provider entity, such as a bank and/or credit card issuer, that issues payment instruments such as payment cards and/or payment accounts to registered users.

The data network 9 may be any suitable data communication network or combination of networks, such as a wireless network, a local- or wide-area network including a corporate intranet or the Internet, using for example the TCP/IP protocol, or a cellular communication network such as Global System for Mobile Communications (GSM), General Packet Radio Service (GPRS), Code Division Multiple Access (CDMA), CDMA2000, Enhanced Data Rates for GSM Evolution (EDGE), Evolved High-Speed Packet Access (HSPTA+), Long Term Evolution (LTE), etc.

As shown, the mobile device 3 includes a trusted application 11 and a third party application 13 that run parallel to each other within an operating system 15. In this exemplary embodiment, the trusted application 11 is a computer software program from the payment provider entity capable of processing a data request to and from one or more payment instruments associated with the user. For example, the trusted application 11 may be a native mobile banking application or a native mobile credit card management application from the user's bank and/or credit card issuer. The trusted application 11 includes executable functionality to communicate data to and from the trusted server 5, for example via corresponding client/server interfaces 17a,17b. In an embodiment, the third party application 13 is a computer software program from a third party developer, for example a merchant entity. Alternatively or additionally, the third party application 13 may be a browser application executing code associated with a merchant web site and thus effectively configured as a third party application 13. The third party application 13 includes a software module such as a trusted application API (application programming interface) 19, providing a set of executable functionality to interface with the trusted application 11. For example, the payment provider entity may provide the API 19 as part of a software development kit (SDK) to registered third parties for inclusion in respective third party applications, with the secured data access functionality being performed via the secure operating environment of the payment provider entity's trusted application 11. A database 20 of the registered third parties may be maintained by the trusted server 5. The third party application 13 also includes executable functionality to communicate data with the third party server 7, for example via corresponding client/server interfaces 21a,21b.

The trusted application 11 is present on the mobile device 3 and pre-configured for secured access by an associated registered user, prior to running of the third party application 13, such that a handover from the third party application 13 to the detected trusted application 11 can be performed via the operating system 15. As is common under normal and customary processes for registration of apps that offer banking and/or payment functions to registered users, upon initial use of the trusted application 11, for example after downloading and installing the app from an online source, the trusted application 11 executes a registration process to configure the app for sole use by the registered user on that user's mobile device 3. The registration process may include determining that the user is a registered user on the trusted server 5, verifying the user's identity for example via an identification and verification (ID&V) process, and receiving user input to configure access control criteria such as a PIN or passcode, a user biometric signature (e.g. fingerprint, iris, facial, etc.), two factor authentication, etc. Thereafter, data is generated and stored by the trusted application 11 to verify the identity of the user and to establish the secure operating environment immediately on subsequent execution of the configured trusted application 11.

Thus, the trusted application 11 is a program module that is configured to run in a secure operating environment and to perform secure tasks, including requesting and retrieving data from a secure database 23 of the trusted server 5 via a database interface 25, only after the trusted application 11 has performed processing steps to authenticate/validate the user's identity. Additionally, the trusted application/server interfaces 17a,17b may include computer executable instructions to establish and transmit data over a secure transmission path between the respective components. User identity authentication may be accomplished by an access controller 27 validating one or more access control criteria against user input that must be provided immediately upon launching or switching operating focus to the trusted application 11, by the operating system 15. Access to all other functions and processes of the trusted application 11 is not allowed until the user's identity is authenticated. The user identity verification process by the access controller 27 may be of a type that is known per se and need not be described further.

As the third party application 13 runs in a separate operating environment, the security level may be unknown to the user and/or trusted server. The third party application 13 may request data services from the trusted application 11 when tasks requiring high levels of security need to be performed, including a request 39 to retrieve data from the secure database 21 of the trusted server 5. Since the trusted application 11 and the third party application 13 are segregated, a data requestor software module 19a of the trusted application API 19 may be used to carry out communication between the third party application 13 and the trusted application 11. The trusted app API 19 includes functionality to determine the presence and/or availability of the trusted application 11 on the same mobile device 3, which may depend on the particular operating system 15 implemented by the mobile device 3. It is also appreciated that responsive to such a determination and depending on an associated policy, the third party application 13 may dynamically determine relevant options to be output for display to the users, such as in the form of buttons, links and any other interactable UI mechanism. For example, the third party application 13 may be configured to detect a message that is advertised or provided by the operating system 15 from an accessibility broadcaster 35 of the trusted application 11, to advertise availability to receive a data request. Additionally or alternatively, the mobile applications 11,13 may establish respective OS hooks 37a,37b in the operating system 15, which may be used to perform switching at an application level and to carry out direct data communication therebetween. The trusted application's OS hook 37a may be a software module or a logical function that runs on top of the broadcaster 35. The third party application's OS hook 37b may be implemented by the trusted app API 19.

Preferably although not necessarily, the data requestor software module 19a is the only means of communication between the operating environments of the trusted application 11 and the third party application 13. For example, the data requestor software module 19a may interface with a corresponding API handler 29 of the trusted application 11 without letting the third party application 13 gain access to any other processing entities in the trusted application 11. The API handler 29 may then relay the request 39 from the third party application 13 to a target processing entity in the trusted application 11, such as the database interface 25. The database 20 of registered third parties may store parameters defining data access criteria for each registered third party that may be used by the database interface 25 to further control the retrieval of data from the secure database 23. The data requestor software module 19a then passes received data 41 from the trusted application 11 back to the third party application 13, responsive to the data request 39. The third party application 13 may include a respective database interface 31 to store data to and retrieve data from a third party database 33 of the third party server 7, for example the data as received 41 from the trusted application 11 in response to the data request 39.

In this way, the respective operating environments are segregated from each other to prevent unauthorised communication of secure information from the trusted application 11 to the third party application 13. It should be appreciated that the system 1 may include other components, sub-components, modules, and devices commonly found in a computing system/device, which are not illustrated in FIG. 1 for clarity of the description. It is also appreciated that the various interfaces may include computer executable instructions for the respective components to establish and transmit data over a transmission path therebetween.

Figure 2B:
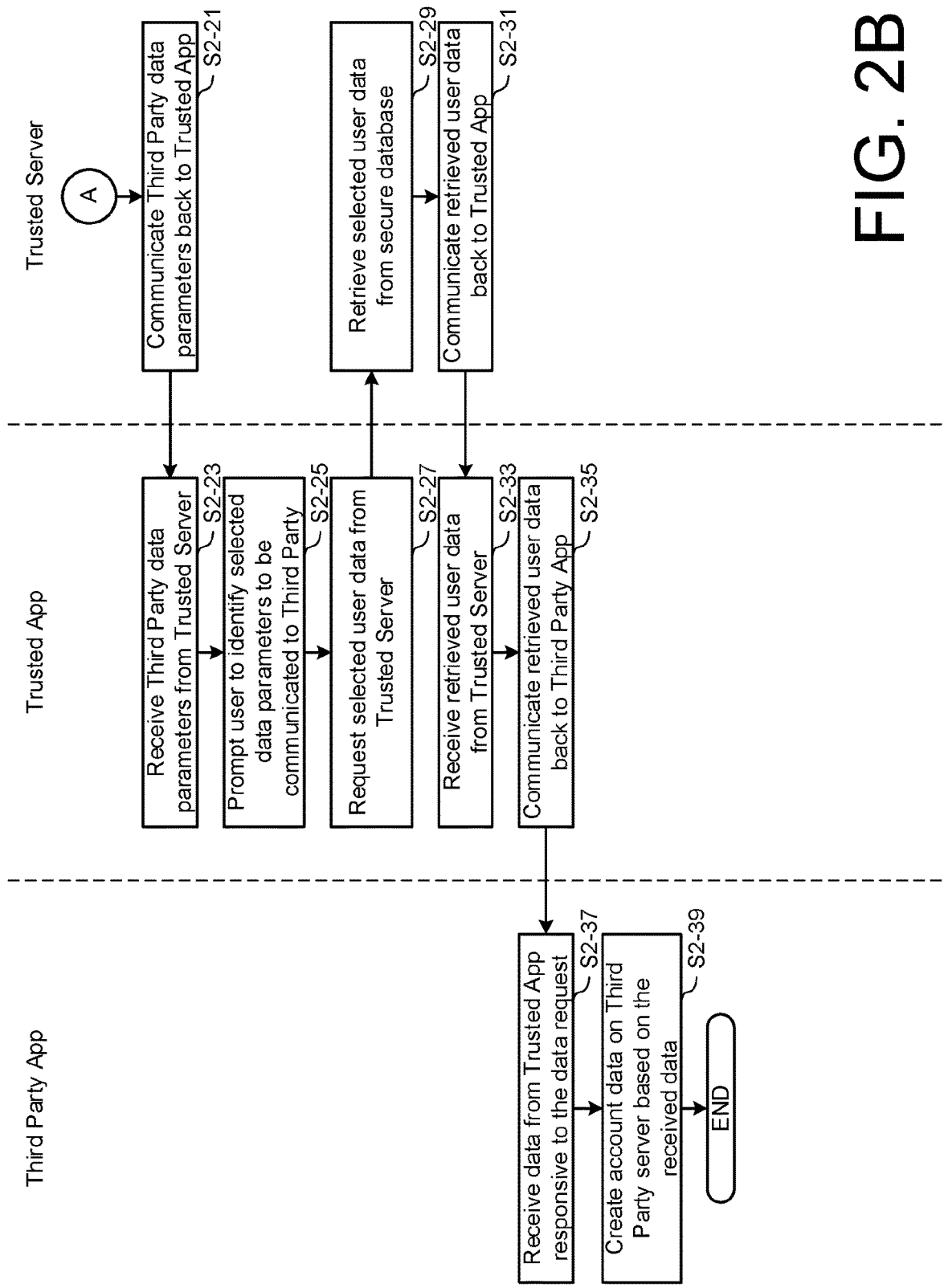

FIG. 2 is a flowchart of a method of performing secured data access processing according to an embodiment, in the exemplary context of an online user account registration process. It is appreciated that alternative embodiments are envisaged in other similar contexts, such as adding a payment instrument to existing user account data, retrieving current data to renew an expired payment instrument, verifying a payment instrument and/or transaction. Yet further possible contexts include guest-checkout and/or other data sharing request processes whereby retrieved user data is only stored in working memory of the third party app 13 and third party server 7 for example to complete a transaction. Reference is also made to FIG. 3, which comprises FIGS. 3A to 3D, showing exemplary user interfaces illustrating the interoperability between a third party application and a trusted application running in parallel on a mobile device, in the secured data retrieval process. As shown, the process begins at step S2-1 where the data retrieval process is initiated by the third party application 13 running on the mobile device 3, for example in the context of a request for user registration, guest checkout and/or data sharing. For example, a registration request may be initiated the first time the third party application 13 is run after installation on the mobile device. At step S2-3, the third party application 13 detects the presence of the trusted application 11 on the mobile device 3. For example, the third party application 13 may call a function provided by the trusted app API 19 to listen for a broadcast message from the accessibility broadcaster 35 of the trusted application 11, or by calling a function provided by the operating system 15 to search for the installed trusted application, for example via a unique application identifier (AID) and/or URL of the associated third party. It will be appreciated that the specific process of detecting the presence of the trusted application 11 will depend on the particular operating system 15 implemented by the mobile device 3.

In response to detecting that the trusted application 11 is present on the mobile device 3, the third party application 13 enables at step S2-5 a user selectable option to request retrieval of data from the trusted application 11. FIG. 3A is an example screen 13'-1 output by the third party application 13 showing a plurality of selection registration options, including an option 51 to retrieve registration details from a Trusted App provided by a trusted entity. Alternative known methods for obtaining details to register the user may also be provided, as schematically illustrated in FIG. 3A. It is appreciated that when the third party application 13 determines that the trusted application 11 is not present on the mobile device 3, the data access functionality described herein may be disabled. The associated registration option may be omitted/hidden, for example to avoid degrading the overall user experience by displaying a button that is not relevant to users who do not have the trusted application 11 installed on the mobile device 3.

At step S2-7, the third party application 13 receives a request to retrieve data from the trusted application 11. For example, the third party application 13 may receive input by the user to select the corresponding option 51 as shown in FIG. 3A. In response, the third party application 13 generates a data request, including data identifying the third party entity associated with the third party application 13. The data request may also identify the type of request, such as a request to create an account, a request to add a payment instrument (such as a payment card or payment account), a request to renew an expired payment instrument, a request to verify a payment instrument and/or transaction, or the payment request upon arriving at the third party's payment processor subsequently triggers a payment verification process, etc. Alternatively, the identification data may be the unique AID of the third party application 13 that may be cryptographically protected. At step S2-11, the third party application 13 communicates the data request to the trusted application 11. Steps S2-9 and S2-11 may be processed through a function call to the data requestor 19a of the trusted app API 19.

At step S2-13, the trusted application 11 receives the data request from the third party application 13, including the third party identifier and the request type if provided. The operating system 15 may cause the trusted application 11 to run if it is not already running in the background, and/or redirect operating focus to the trusted application 11 to receive the data request. It is appreciated that this redirection of operating focus may appear in the foreground by taking the user to the trusted application 11, or may work in the background for example by leveraging an extension from the trusted application 11 which would enable user input to perform security tasks of the access controller 27 to access the secure operating environment of the trusted application 11, without the appearance of leaving the operating environment of third party application 13. As schematically illustrated in the exemplary screen 13'-2 of FIG. 3B, the third party application 13 (or the operating system 15) may be configured to output a prompt 53 for the user to confirm the switch from the third party application 13 to the trusted application 11. The data request may be received through the API handler 29 of the trusted application 11. At step S2-15, the access controller 27 of the trusted application 11 processes user identity verification, for example in response to the operating system 15 switching or handing over operating focus from the third party application 13. FIG. 3C shows an example screen 11'-1 of the trusted application 11 illustrating a user PIN input 55 and verification process. It will be appreciated that no access to the trusted application 11 is possible until the access controller 27 has verified the user's identity.

Depending on the data request scenario, the trusted application 11 would retrieve the user's data from the secure database 23 of the trusted server 5 that would be needed to complete the third party application's data request, and display within the trusted application 11 or within the third party application 13 for the user to select 61 which data item(s) they would like to share. The user may be provided with the option to edit one or more of the retrieved data to be shared, for example as populated into one or more data fields of an electronic form or output screen of the application 11,13. The third party application 13 may be notified when user input to manually update the retrieved data is received via the trusted application 11. The updated data may be stored by the trusted application 11 and/or the trusted server 5 for future retrieval. Some users may pre-select a default set of data that they would be willing to share with any $3^{rd}$ party applications. Accordingly, in this embodiment, once the access controller 27 has verified the user's identity, then at step S2-17, the trusted application 17 requests a set of data parameters for the third party entity identified in the data request, from the registered third parties database 20 in the trusted server 5 via the database interface 25. For example, data parameters may be stored for each registered third party entity defining the types of data that may be provided to the registration process via the third party application 13. It will be appreciated that the data types will correspond to data elements of the user's registered data as stored in the secure database 23 of the trusted server, and each data element/type may be referenced by respective unique identifiers or any other form of metadata. At step S2-19, the trusted server 5 retrieves the set of data parameters associated with the identified third party entity (and/or the third party application 13) and communicates the data parameters back to the trusted application 11, at step S2-21.

Alternatively, the trusted application 17 may retrieve and display all of the user data elements corresponding to the set of third party data parameters, for the user to select the data elements to be shared with the third party application 13 (and the associated third party entity). FIG. 3D is an example screen 11'-2 output by the trusted application 11, schematically illustrating a list of required and optional data types 57a defined for a particular third party entity, and corresponding user data elements 57b as retrieved from the secure database 23 (and populated into respective data fields of the output screen 11'-2). As shown, the user in this particular example has five payment instruments 59 registered with the trusted server, three payment cards, one bank account, and one credit card account. The user has also selected to share details of only four of the five payment instruments, 59-1 to 59-4, as schematically illustrated by the corresponding option box UI elements. Each payment card may be associated with corresponding payment card data (which may be tokenised and/or encrypted), and additional card details such as the 16-digit PAN, expiry date, name on card, CVV, etc. for each of the cards and payment accounts that the customer has registered with the trusted server 5. Particular data elements, such as the payment card CVV number may be used solely for an initial verification check by the third party application 13, and need not be subsequently stored by the third party server 7, for example in accordance with compliance guidelines.

As also shown in FIG. 3D, the example required user data fields include first and last name, email address, postal address, postcode, The optional user data fields include a profile photo, birth date, passport details, and phone number. Numerous other types of user data are envisaged, such as age, age range, billing address, mobile number, and/or other ID information such as from the passport, a driver license, etc. The API handler 29 may be configured to encrypt the retrieved data elements for secure transmission back to the third party application 13 or passes a token to the third party application 13 that would grant the application access to the data via the trusted app API 19. The user may choose to read the Terms & Conditions from both the third party application 13 and the trusted application 11.

At step S2-23, the trusted application 11 receives the set of third party data parameters for the trusted server 5 and outputs a prompt for the user to identify selected ones of the set of third party data parameters that are authorised to be retrieved and communicated to the third party entity. In the context of a merchant third party entity offering purchase of goods and/or services via the associated third party application 13, one of the third party data parameters will be identification of one or more existing payment instruments registered to the user. In response to receiving user selection of authorised data types from the set of third party data parameters, the trusted application 11 requests at step S2-27 the corresponding user data elements, including the data identifying at least one payment instrument, from the trusted server 5 for example via the database interface 25. At step S2-29, the trusted server 5 retrieves the selected user data elements from the secure database 23, including data identifying one or more payment instruments corresponding to the requested payment instrument(s), such as the tokenised and/or encrypted payment instrument data and/or a token for payment. The payment instrument data may include data identifying the trusted application 11, the trusted server 5, and/or the trusted entity associated therewith. It is appreciated that tokenised and/or encrypted payment instrument data and/or a token for payment may be of a type that is known per se, and need not be described further. At step S2-31, the retrieved user data is communicated back to the trusted application 11.

At step S2-33, the trusted application 11 receives the retrieved user data from the trusted server 5, and communicates the retrieved user data back to the third party application 13 at step S2-35, as a response to the data request for example via the data requestor 19a of the trusted app API 19. At step S2-37, the third party application 13 receives the user data from the trusted application 11 responsive to the data request, and the present exemplary context, would proceed to create a new account in the third party database 33, based at least on the received user data including the tokenised payment card data for the one or more selected payment instruments to be associated with the user's registered account on the third party server 7. It is appreciated that the third party application 13 may automatically populate the received data elements into corresponding data fields of an electronic registration form, and output prompts for the user to provide any missing data elements required to complete the registration/account creation process.

It is understood that additional method steps may be performed before, during, or after the steps discussed above. For the sake of simplicity, however, these additional steps are not specifically illustrated or discussed herein. It is also appreciated that the trusted app API 19 may provide similar functionality to update data stored in the third party database 33, for example to repeat the process of steps S2-3 to S2-33 to retrieve new/updated payment instrument data to replace an expired payment instrument in the user's account data. It is appreciated that the data retrieved from the trusted server 5 via the trusted application 11 may be utilised by the third party application 13 in other ways depending on the particular implementation context and/or type of data request. For example, in the above-mentioned guest checkout scenario, the data elements selected by the user to be retrieved and shared to the third party application 13 would not be stored permanently by the third party application beyond the nature to service that particular transaction or data request.

Figure 4:
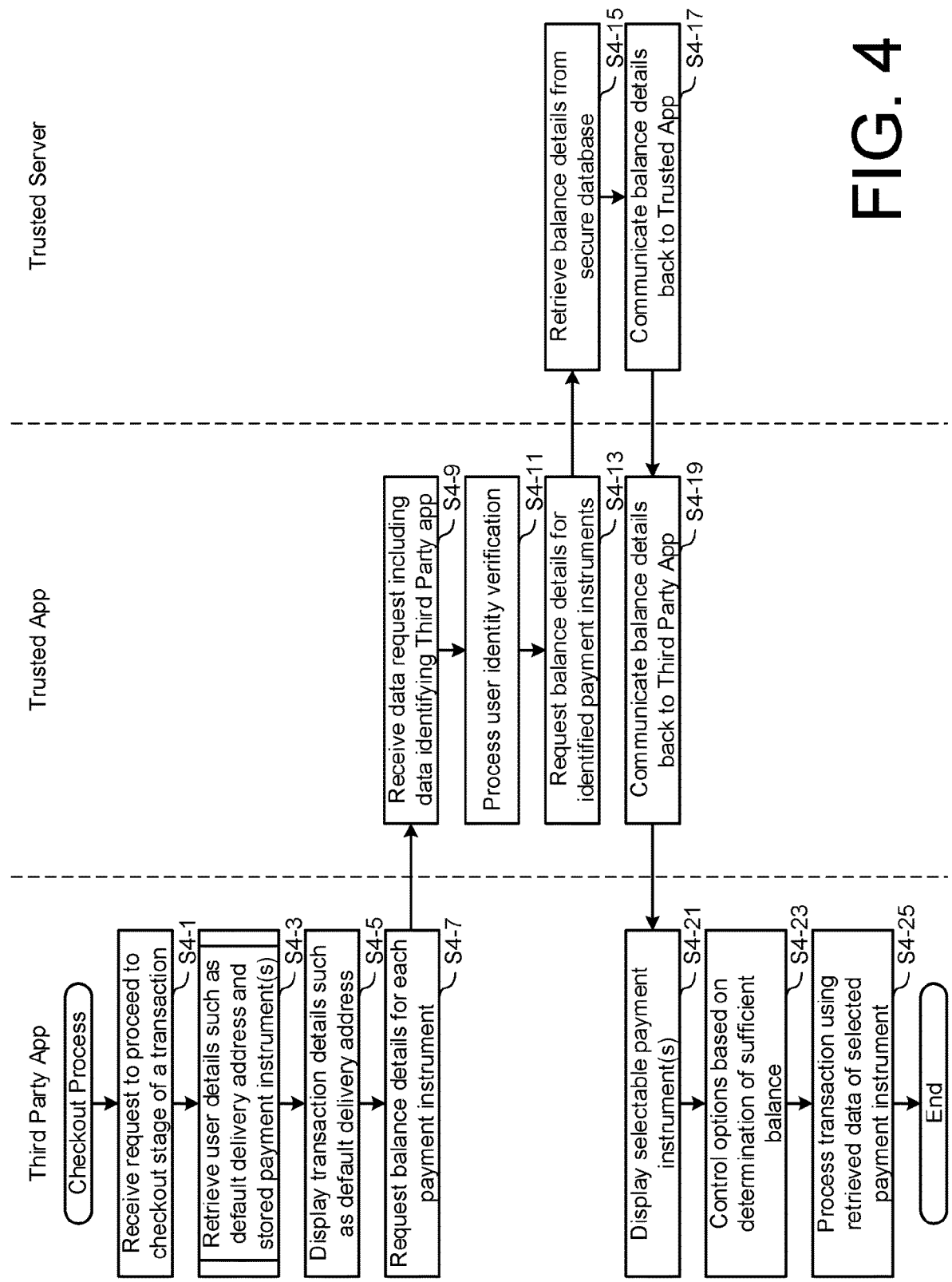
FIG. 4 is a flow diagram illustrating the main processing steps performed by data processing components of the system of FIG. 1 in a mobile commerce checkout process, according to an exemplary embodiment.
Figures 5A, 5B:
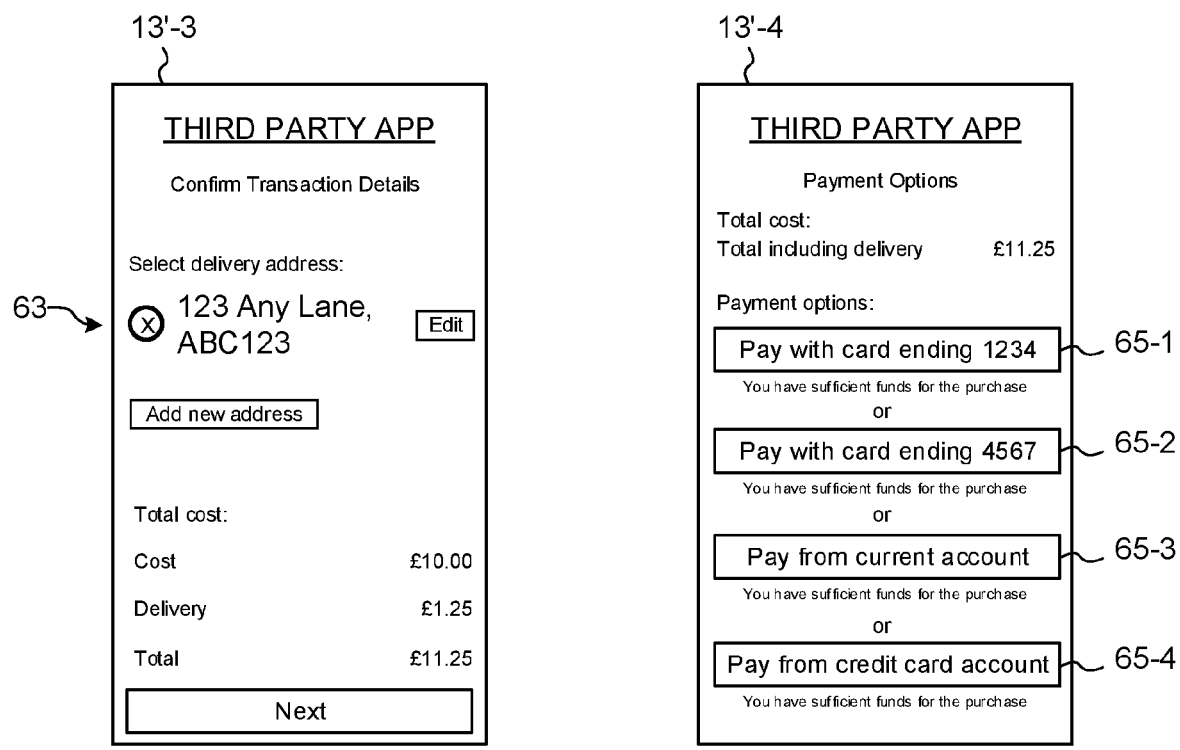
FIGS. 5A and 5B, are exemplary user interfaces of the exemplary mobile commerce checkout process illustrated in FIG. 4.

FIG. 4 is a flowchart of a method of performing data processing in a mobile commerce checkout process. Reference is also made to FIG. 5, which comprises FIGS. 5A and 5B, schematically illustrating an exemplary user interface of a third party application during a mobile commerce checkout process. At step S4-1, the third party application 13 receives a request to proceed to the checkout stage of a transaction with the associated third party entity. Following from the exemplary context discussed above, the third party entity may be a merchant requiring the user to specify, at the checkout stage of a transaction, at least a payment instrument to effect payment for the transaction. In this exemplary embodiment, the user is registered with the third party server 7, for example following the process described above with reference to FIG. 2. Alternatively, the user may not wish to register details with the third party server 7 and instead would proceed to checkout as a guest (unregistered user), via the data retrieval functionality provided via the trusted application 11. Accordingly, in this exemplary embodiment, the third party application 13 retrieves at step S4-3 registered user details, such as a default delivery address and the one or more stored payment instruments required to complete the checkout stage, from the third party database 33 via the database interface 31. Alternatively, in the case of a guest checkout, the third party application 13 may be configured to process a data request via the trusted application 11, as discussed above with reference to FIG. 2. At step S4-5, the third party application 13 may display a transaction details confirmation screen, including retrieved user details such as the default delivery address. FIG. 5A shows an example transaction details confirmation screen 13'-3 of the third party application 13, schematically illustrating the retrieved delivery address data 63 as populated into a corresponding data field of a checkout screen, for selection by the user to proceed to the next stage of the checkout process.

Optionally, at step S4-7, the third party application 13 may request supplementary data related to each of the user's payment instruments registered with the third party entity, such as balance details (or available credit) or indicator of sufficient funds or credits for each payment instrument. In this event, the trusted application 11 would receive the data request at step S4-9, the data request including data identifying the third party application 13 and the nature of the request. At step S4-11, operating focus is again redirected to the trusted application 11, which processes user identity verification before allowing access to the API handler 29 functionality. At step S4-13, the trusted application 11 requests balance details for the identified payment instruments from the trusted server 5. Optionally, the third party application 13 may use an access token to request for the data from the trusted server 5. At step S4-15, the trusted server responds to the data request by retrieving balance details from the secure database 23, for example via the database interface 25. At step S4-17, the retrieved balance details are communicated to the trusted application 11. The retrieved balance details may be passed from the trusted application 11 back to the third party application 13 at step S4-19, for example via the API handler 29.

At step S4-21, the third party application 13 outputs the user's selectable payment instrument(s) as registered with the third party server 7. The third party application 13 may be configured to dynamically control available options for one or more payment instruments based on a determination of sufficient balance/credit for the present transaction. For example, the option to select a particular payment instrument may be disabled or omitted if there is insufficient balance or credit to cover the transaction amount. FIG. 5B shows an example payment options screen 13'-4 of the third party application 13, listing the user selectable payment options 65-1 to 65-4, corresponding to the payment instruments 59-1 to 59-4 selected by the user to be shared by the trusted application 11 to the third party application 13, together with an indication of the associated balance details.

At step S4-23, the third party application 13 receives user input selection of the payment instrument to be used to effect payment of the present transaction, and proceeds to process the transaction using the corresponding tokenised payment card data, for example by routing a payment request to the merchant's payment gateway as is well known in the art. Optionally, when a payment card is selected, the third party application 13 may be configured to prompt the user to enter the CVV number of the associated card as an additional verification step, and/or to carry out a biometric authentication (e.g. fingerprint, voice, etc.) to further authenticate the user's identity before authorising the payment transaction.

As mentioned above, many other types of data requests are envisaged, such as a "transaction verification" request, a "user verification" request, a "card verification" request, etc. For example, in a Payment Services Directive (PSD2) compliant scenario, involving Strong Customer Authentication (SCA), the payment request from the third party application 13 may directly or indirectly trigger a SCA-compliant procedure. In such a context, the trusted server 5 may be configured to receive a transaction request from the merchant (third party) server 7, or an associated merchant acquirer, and in response to processing the received transaction data against defined risk criteria/rules (such as a threshold transaction amount, transaction pattern, etc.), may generate and transmit a transaction verification request back to the merchant server 7, as well as to push a corresponding verification request message to the associated customer's trusted application 11. The transaction verification request may be passed by the merchant server 7 to the merchant (third party) app 13 on the user's mobile device 3 for processing via the trusted app API 19 as discussed in the embodiments above.

In response to handover from the merchant app 13 to process a verification type of data request, the trusted application 11 will verify the user's identity before proceeding to identify the corresponding transaction verification request received from the trusted server and prompting the user to accept/approve the pending transaction within the secure operating environment. The trusted application 11 may also retrieve corresponding data elements, for example from the secure database of the trusted server, for further verification of the transaction (and/or the user and payment instrument identified in the data request), before returning data defining a verification response based on the outcome of the verification process. The payment request may also contain data indicating that the payment instrument token originated from the use of the trusted application 11.

Advantages

The described embodiments advantageously provide a merchant-facing system architecture that enables merchant to provide a frictionless data sharing and m-commerce registration, account opening, guest check-out and payment experience for their customers, thus an improved overall user experience and at reduced development cost to merchants.

Further, the system architecture provides reduced exposure to fraudulent interception of sensitive data otherwise transmitted over the air, by providing for secured payment card provisioning (or re-provisioning to replace expired cards) in the registration process. Consequently, there is also improved trust/confidence by enabling issuers with registered mobile users to be able to pass information that indicates an authenticated user adding an existing payment card at the time of account set-up, thereby also reducing payment authorisation rejection rates and consequential risk to the merchant.

Optimally, the merchant's own PSP mobile integration partner services can be 'wrapped' by the trusted server's SDK or in the form of packaged software code so that user authenticated state tokens can be included in the existing payment PSP request structures in an optimal fashion.

Example Computer System Implementation

Figure 6:
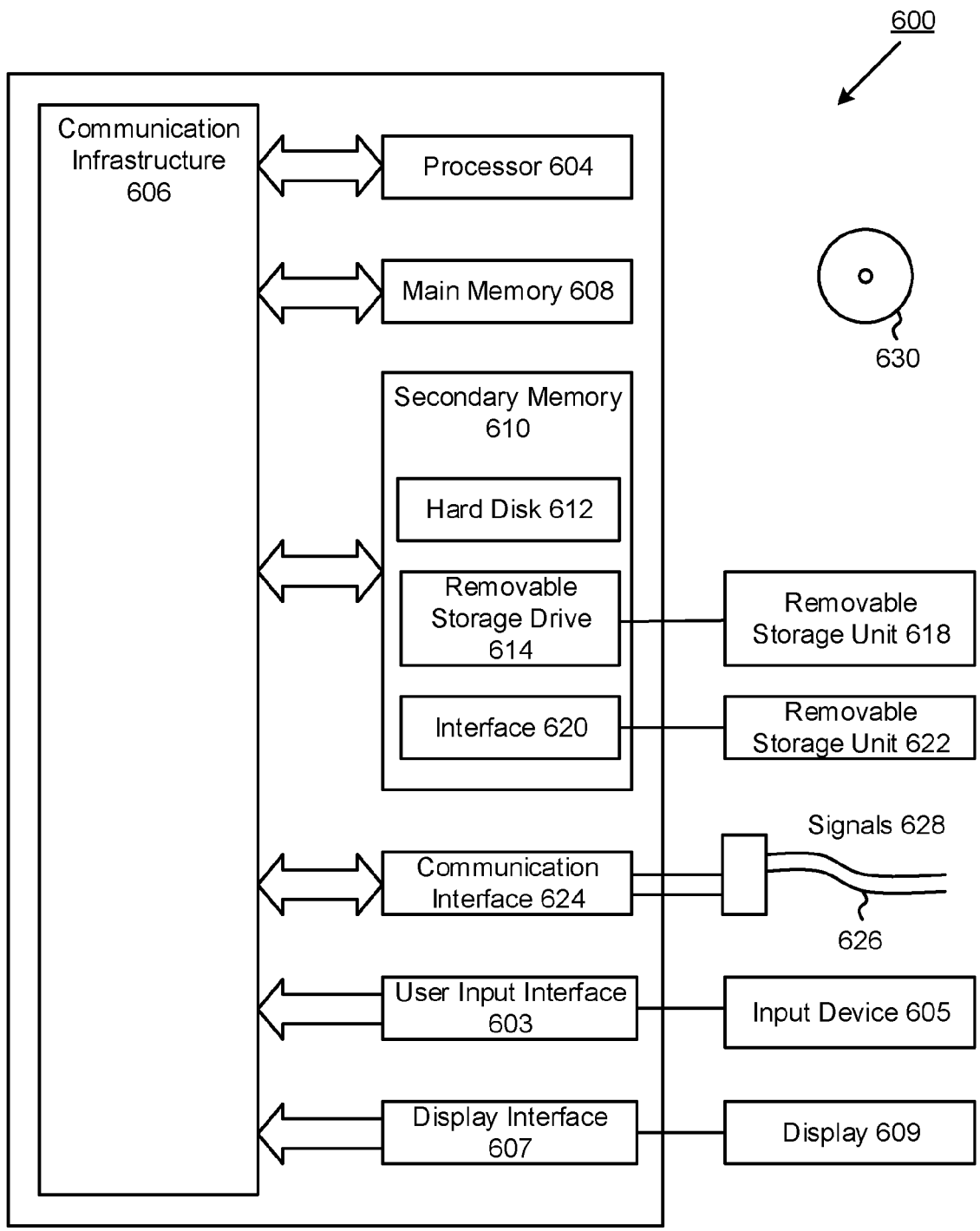
FIG. 6 is a diagram of an example of a computer system on which one or more of the functions of the embodiments may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by the flowcharts of FIGS. 2 and 3 can be implemented in system 600. The component architectures in the system 1 of FIG. 1 can also each be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general-purpose processor. Processor 604 is connected to a communication infrastructure 606 (for example, a bus, or network).

Computer system 600 also includes a main memory 608, preferably random access memory (RAM), and may also include a secondary memory 610. Secondary memory 610 may include, for example, a hard disk drive 612, a removable storage drive 614, flash memory, a memory stick, and/or any similar non-volatile storage mechanism. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a non-transitory computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like.

Computer system 600 may additionally include computer display 630. According to an embodiment, computer display 630, in conjunction with display interface 602, can be used to display UI 115 on operator console 110. Computer display 630 may also be used to display interfaces of the applications for example as depicted in FIGS. 4 and 5.

In this document, the terms "computer program medium," "non-transitory computer readable medium," and "computer usable medium" are used to generally refer to media such as removable storage unit 618, removable storage unit 622, and a hard disk installed in hard disk drive 612. Computer program medium, computer readable storage medium, and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts of FIGS. 2 and 3, and system architecture of FIG. 1 discussed above. Accordingly, such computer programs represent controllers of the computer system 600. Where the invention is implemented using software, the software may be stored in a computer program product and loaded into computer system 600 using removable storage drive 614, interface 620, hard drive 612, or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Further Alternatives and Modifications

It will be understood that embodiments of the present invention are described herein by way of example only, and that various changes and modifications may be made without departing from the scope of the invention.

For example, in the embodiments described above, the trusted app is configured to retrieve data elements from an associated secure database of the trusted server, the data elements including a tokenised version of the or each existing payment card. It will be appreciated that as one alternative, the trusted application, associated for example with a payment provider, may encrypt the retrieved payment card details using a pre-established cryptography key associated with that particular third party (such as a public encryption key for a merchant), and pass the data to the third party server directly. The third party server would then use their pre-established cryptography key (for example a corresponding private key as provided by the trusted server) to decrypt the received data, and may auto-populate the decrypted payment card details into a card payment form from their own acquirer. More specifically, the merchant in such an arrangement now acts as a middle man between the trusted server and their own acquirer. Optionally, the middle-man role functions can be carried out by the acquirer. The payment provider would keep track of the cryptography keys assigned to the merchants (and/or their developers), for example in the registered third parties database of the trusted server. In this way, the presence of the secure access control by the present embodiment is completely invisible to the merchant acquirer and without needing any form of card tokenisation.

In the embodiments described above, the third party application is configured to perform an online account registration process separate from an online checkout process. As those skilled in the art will appreciate, the third party application may instead generate and transmit a data request including both a request to process a specified transaction and to return retrieved data from the secure database to facilitate online registration of the associated user. In such an alternative, the trusted application may be further configured to process the specified transaction, for example via the trusted server using payment card data retrieved from the secure database. The third party application would then receive data from the trusted application including the selected elements of retrieved user data, as well as data identifying completion of the specified transaction by the trusted server.

As yet another alternative, the trusted app API functionality may be provided as one or more distributed computing modules or processing services on a remote server that is in communication with the other system components via the data network, or as a plug-in module, extension, embedded code, etc., configured to communicate with the third party application program.

Reference in this specification to "one embodiment" are not necessarily all referring to the same embodiment, nor are separate or alternative embodiments mutually exclusive of other embodiments. In particular, it will be appreciated that that although the respective processes and associated processing modules are described as separate embodiments, aspects of the described embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A method, comprising:
    generating a data request at a first application that runs in a first operating environment of a mobile device, wherein the data request contains data identifying the first application;
    communicating with a second application that runs in a second operating environment in parallel to the first environment of the mobile device, wherein the second application is a trusted application that runs in a secure environment, and wherein the communicating includes transferring the data request identifying the first application to the second application, and wherein receipt of the data request causes the second application to:
        identify a subset of a plurality of data types based on the identifying data; and
        retrieve a subset of data associated with a user from a database on a remote server, the subset selected based on the identified subset of the plurality of data types; and
    receiving data from the trusted application responsive to the data request.

2. The method of claim 1, wherein data request handling functionality of the second application cannot be accessed until the secure environment is established.

3. The method of claim 2, wherein the secure environment is established immediately upon execution of the second application, by verifying the identity of the user.

4. The method of claim 3, wherein data to verify the identity of the user is generated and stored when the second application is configured for initial use.

5. The method of claim 1, wherein the second application encrypts the data communicated to the first application.

6. The method of claim 1, wherein the trusted application communicates a further subset of the received data to the first application responsive to the data request.

7. The method of claim 6, wherein the further subset of data is determined from user input.

8. The method of claim 1, wherein the received data comprises data identifying a tokenised payment card or encrypted payment information or encrypted payment account details.

9. The method of claim 8, wherein the tokenised or encrypted payment instrument data includes data identifying an entity associated with the trusted application.

10. The method of claim 9, wherein the data request further identifies one or more data entities to be verified, and wherein the trusted application processes the retrieved data to verify said one or more data entities.

11. The method of claim 10, wherein the data request comprises a payment request token.

12. The method of claim 1, wherein the first application is a web browser or a native mobile application.

13. The method of claim 1, wherein the first application is a software program from a third party developer and the second application is a trusted software program from a payment provider.

14. The method of claim 1, wherein the first application includes a software module from a payment provider to communicate with the second application.

15. The method of claim 14, wherein the software module is an API of a software development kit.

16. A method, comprising:
    receiving a data request from a first application that operates in a first environment of a mobile device, wherein the data request contains data identifying the first application, the data request received by a second application that operates in a second environment in parallel to the first environment of the mobile device, wherein the second application is a trusted application that operates in a secure environment;
    identifying a subset of a plurality of data types based on the identifying data;
    retrieving a subset of data associated with a user from a database on a remote server responsive to the data request, the subset selected based on the identified subset of the plurality of data types; and
    communicating data from the trusted application to the first application.

17. A mobile device comprising:
    means for generating a data request at a first application that runs in a first operating environment of a mobile device, wherein the data request contains data identifying the first application;
    means for communicating with a second application that runs in a second operating environment in parallel to the first environment of the mobile device, wherein the second application is a trusted application that runs in a secure environment, wherein the communicating includes transferring the data request identifying the first application to the second application, and wherein receipt of the data request causes the second application to:
        identify a subset of a plurality of data types based on the identifying data; and
        retrieve a subset of data associated with a user from a database on a remote server, the subset selected based on the identified subset of the plurality of data types; and
    means for receiving data from the trusted application responsive to the data request.

18. A mobile device comprising:
means for receiving a data request from a first application that operates in a first environment of a mobile device, wherein the data request contains data identifying the first application, the data request received by a second application that operates in a second environment in parallel to the first environment of the mobile device, wherein the second application is a trusted application that operates in a secure environment;
means for identifying a subset of a plurality of data types based on the identifying data;
means for retrieving a subset of data associated with a user from a database on a remote server responsive to the data request, the subset selected based on the identified subset of the plurality of data types; and
means for communicating data from the trusted application to the first application.

19. A non-transitory computer-readable medium comprising machine readable instructions stored thereon, that when executed perform a method of claim 1.

20. A non-transitory computer-readable medium comprising machine readable instructions stored thereon, that when executed perform a method of claim 16.

21. The method of claim 16, wherein communicating the data from the trusted application to the first application comprises communicating the retrieved data or a token granting the first application access to the retrieved data.

* * * * *